E. K. BAKER.
DEMOUNTABLE CLUTCH RIM.
APPLICATION FILED APR. 7, 1916.
1,299,541.
Patented Apr. 8, 1919.
3 SHEETS—SHEET 1.
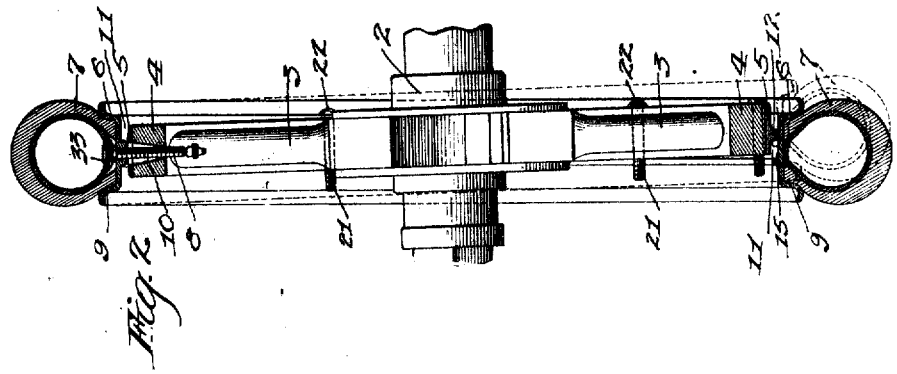
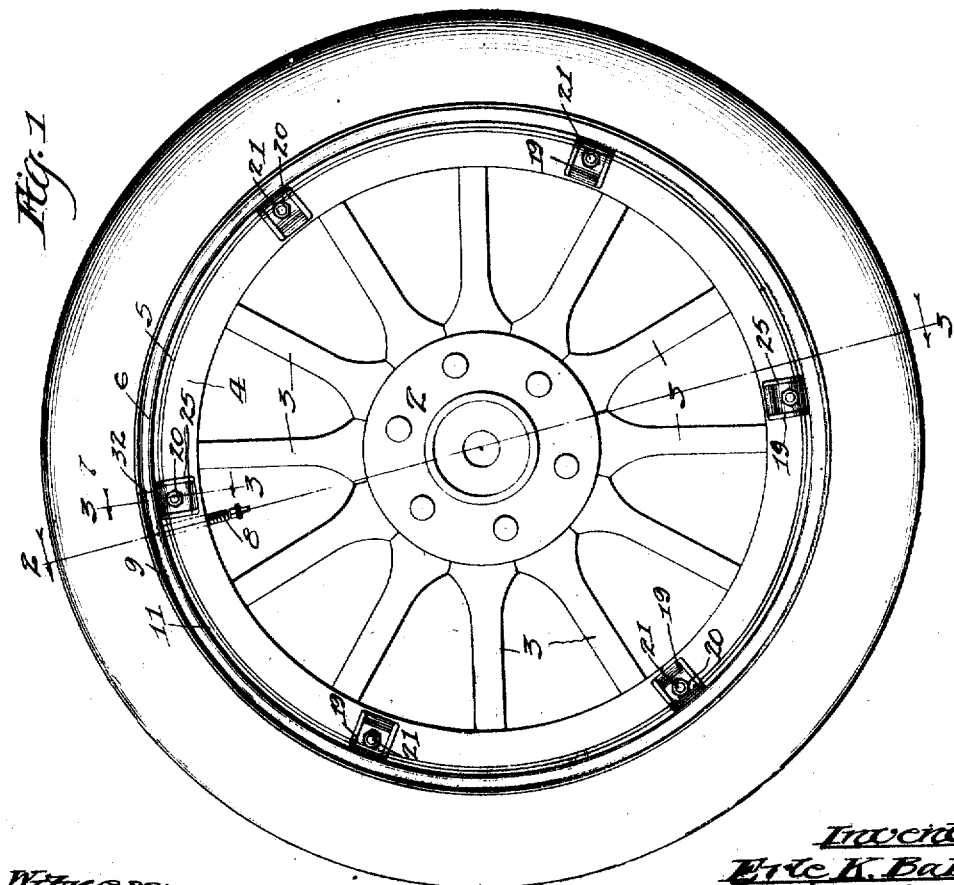

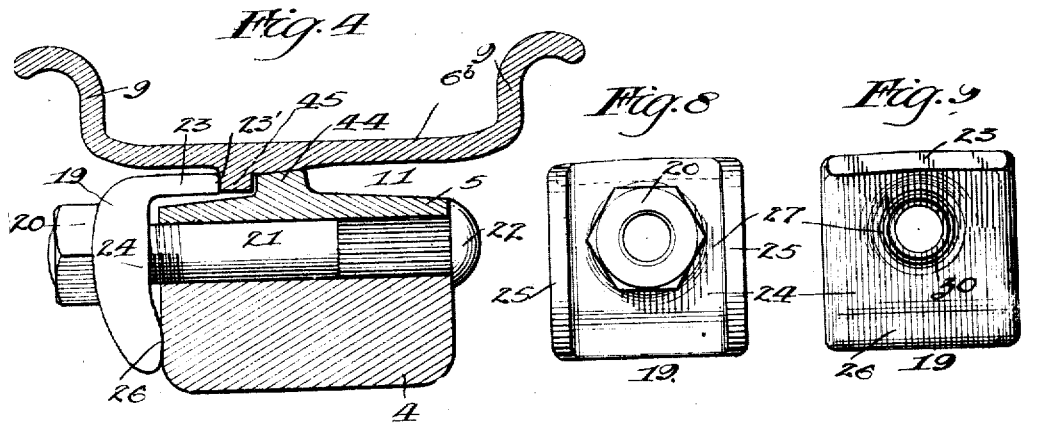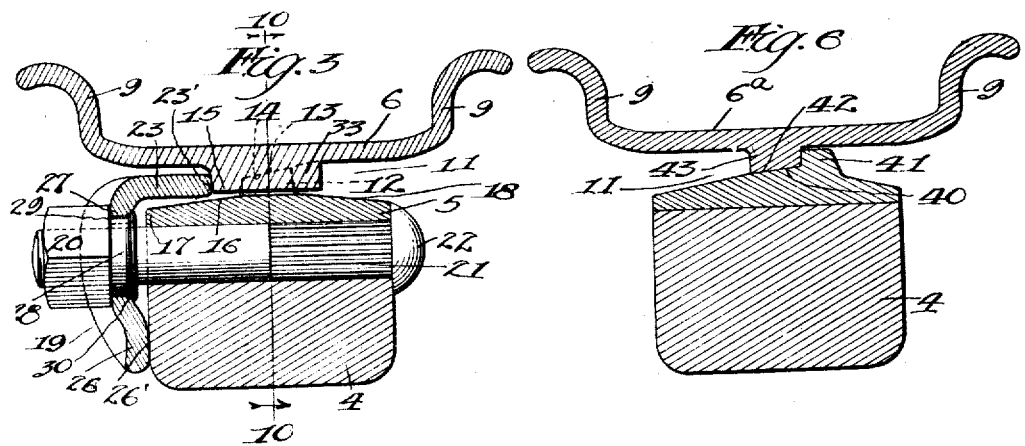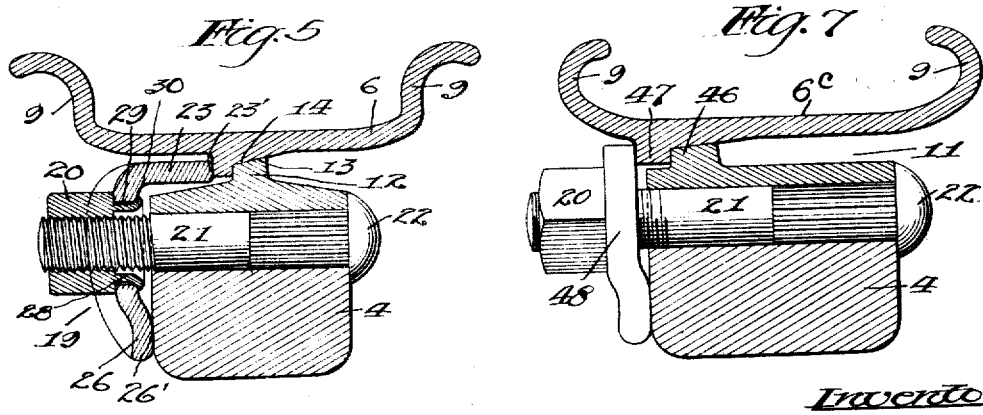

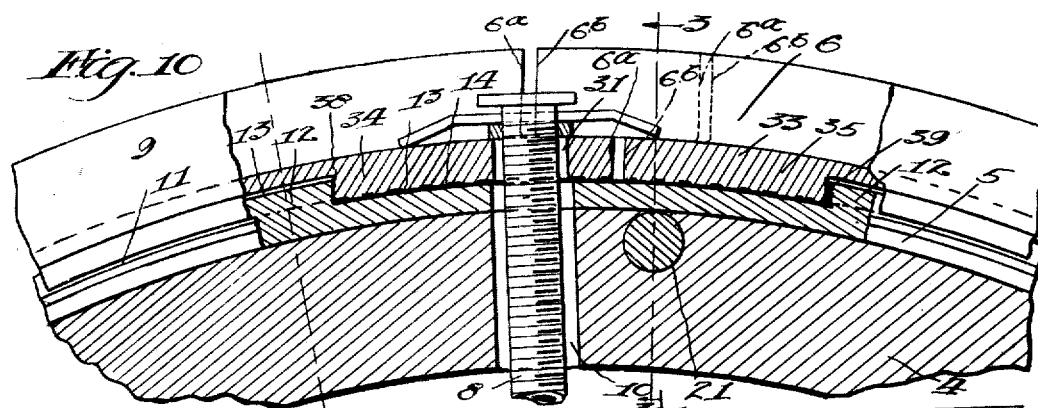
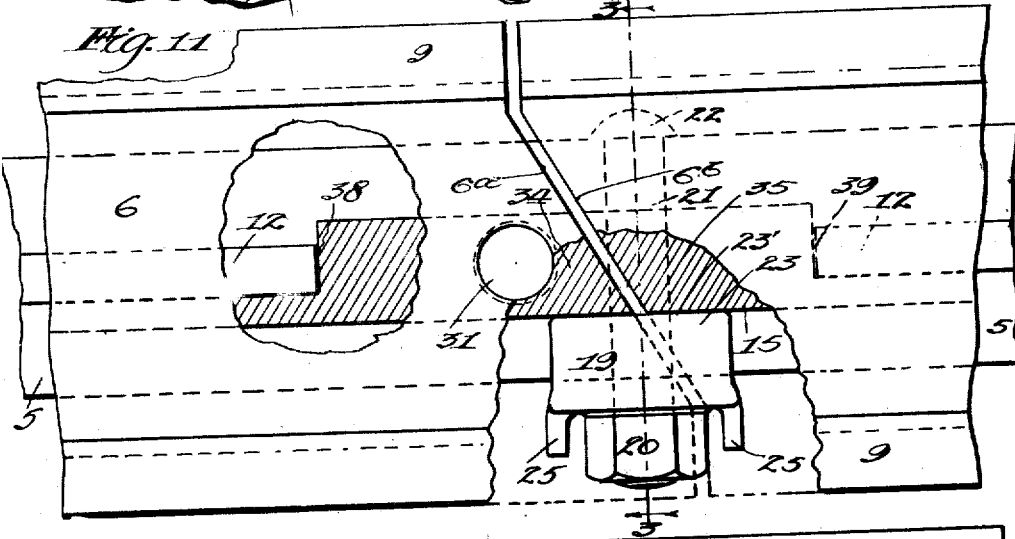
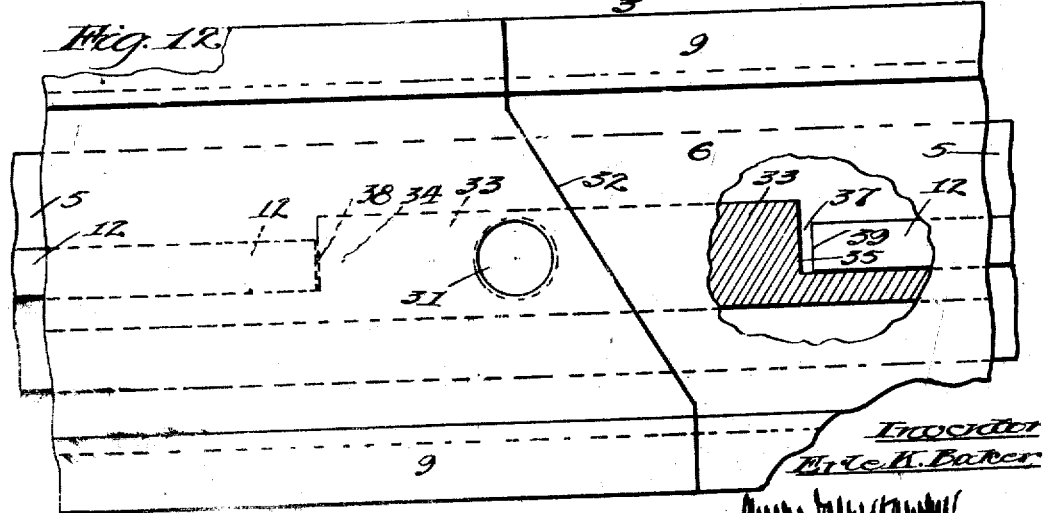

UNITED STATES PATENT OFFICE.

ERLE KING BAKER, OF CHICAGO, ILLINOIS, ASSIGNOR TO UNIVERSAL RIM COMPANY, OF CHICAGO, ILLINOIS, A CORPORATION OF ILLINOIS.

DEMOUNTABLE CLUTCH-RIM.

1,299,541.  Specification of Letters Patent.  Patented Apr. 8, 1919.

Application filed April 7, 1916. Serial No. 89,701.

*To all whom it may concern:*

Be it known that I, ERLE KING BAKER, a citizen of the United States, residing at Chicago, Cook county, Illinois, have invented certain new and useful Improvements in Demountable Rim Constructions for Motor-Vehicle Wheels, entitled Demountable Clutch-Rims, of which the following is a specification.

My invention relates to demountable rim constructions for motor vehicle wheels which are equipped with tires that require changing from time to time.

It is the usual practice to put a pneumatic tire upon a demountable rim, and there inflate it before mounting the rim on the wheel of the motor vehicle. In event the tire is injured or deflated, the rim is demounted, and replaced by another bearing an inflated tire; and the detaching of the injured tire from its rim, as well as the repairing of the tire, may be postponed.

The general objects of my invention will be made clear by the following statement of the problems and needs presented by the above defined practice.

The rim should be so made that it will be easy to attach and detach the tire, particularly in the case of tires having inextensible base beads. The rim must be capable of safely and securely holding the tire, both when in service on the wheel and when being carried as an inflated "spare." The rim and wheel construction should be such that it shall be easy to both mount and demount the rim with its tire (whether inflated or deflated) and at the same time provide for the secure and dependable holding of the rim and tire against movement on the wheel during service. The true circular form of the tire and rim should be constantly maintained. The tire should be held truly perpendicular to the axis of the wheel. The distortion of either the rim or the tire should be avoided. The concentricity of the tire and rim with respect to the axis of the wheel should be positively insured and constantly maintained. Unless the demounting means responds to the above requirements the structure cannot be pronounced safe or desirable, and if the circularity, concentricity and perpendicularity of the tire are not maintained, it will be found that the life of the tire is materially shortened. In addition to these requirements, it is essential that the construction shall be of the least weight consistent with the service to be performed, and it is commercially necessary that the cost of both manufacture and maintenance shall be low. It is also extremely desirable that the construction shall be such that the rim may be mounted and demounted by the operation of few parts and in the least possible time.

For use with standard clencher tires which have base beads that may be stretched over its flanges, the rim may be of the integrally flanged endless type, and, to that extent, simpler than those required for tires having non-stretchable base beads. But in all other respects, the problem remains the same: for the matters of demountability, security, non-distortion, circularity, concentricity, and perpendicularity are of equal importance as to all tires.

The specific object of my invention is to provide a rim demounting wheel construction which shall be applicable to rims and tires of all types and which shall provide the complete solution of all of the above stated problems.

The general nature and principles of my invention, and also the details of the best embodiment thereof that I have thus far devised, will be readily understood on reference to the drawings that form part of this specification; and are particularly pointed out in the appended claims.

In said drawings:—Figure 1 is an outer side elevation of a motor vehicle wheel and rim, embodying my invention; the same being equipped with a pneumatic tire;—Fig 2 is a section on the line 2—2 of Fig. 1, showing the rim in the act of being "buttoned-on" to the wheel;—Fig. 3 is a full sized cross section, on the lines, 3—3 of Figs. 1, 10 and 11;—Fig. 4 is a like view of a rim of larger cross-section;—Fig. 5 is like Fig. 3, but shows a rim and wheel of smaller cross section;—Fig. 6 is a sectional view showing a modified arrangement of the clutch and stop ribs;—Fig. 7 illustrates a still further modification of the invention;—Fig. 8 is an outer side view of one of my novel clutch or stop lugs;—Fig. 9 is an inner view thereof;—Fig. 10 is a vertical section on the line 10—10 of Fig. 3;—Fig. 11 is a plan view taken from Fig. 10;— and Fig. 12 is a similar plan view, showing the rim ends as they appear when first placed on the wheel.

The wheel shown in the drawings is an automobile wheel of the kind in most common use, i. e., is made up of a hub, 2; spokes, 3; wooden felly, 4; and a metal felly band or fixed rim, 5, fastened to the felly. The felly band differs from those previously used, in the particulars hereinafter explained. The demountable rim, 6, is mounted on the fixed rim by means of the clutch parts hereinafter described, and carries the pneumatic tire, 7, of which 8 is the valve stem. As before stated, the demountable rim may be of any desired cross section, according to the type of tire to be carried thereby, but I prefer that in every case, whether of the straight form (shown in Fig. 3) or of the clencher form (shown in Fig. 7), it shall be characterized by integral tire-holding flanges, 9. Measurably good results may be secured with my invention when the integral flanged demountable rim is of the endless type appropriate to standard clencher tires, but far greater convenience and greater accuracy in position are attained when the integrally flanged rim is transversely split, as hereinafter described.

As shown in Fig. 2, my novel rim is of the type to be buttoned on and unbuttoned from the wheel, i. e., the fixed rim and felly of the wheel are provided with a valve stem hole, 10, which receives the valve stem, 8. In placing the tire and rim on the wheel, the valve stem is first put into the hole, 10, and from that moment serves as a pivot point or hinge upon which the rim may be swung as required to button and unbutton it. The dotted lines of Fig. 2 illustrate the buttoned-on condition of the rim and tire, while the full lines illustrate an intermediate position: the act of buttoning on or unbuttoning the rim from the wheel.

For the accomplishment of this buttoning and unbuttoning of the rim, as compared with sliding of the rim on to the wheel axially, it is necessary that there shall be an annular space or clearance, 11, between the wheel and the inner periphery of the rim. Within this space I provide the members of the clutch comprehended by my present invention and which provides a circumferential support or junction between the wheel and the rim.

At this point I may explain that I prefer that all forms of the rims herein illustrated shall be made from hot rolled sections of the respective cross sections depicted. Thus the fixed rim on the wheel is in each case characterized by a circumferential rib, and, likewise the demountable rim is in each case characterized by a complementary circumferential rib.

The preferred construction is depicted in Figs. 2, 3, 5, 10, 11 and 12 and will be the first to be described in detail. The circumferential rib, 12, belonging to the fixed rim is positioned in the middle or neutral plane of the wheel, the position of which is indicated by the line 10—10 in Fig. 3. The top or outer face of this rim is a cone, 13, of relatively low pitch, so that it may tend to cling to the demountable rim which is formed to fit the same. The rim, 6, is provided with a conical inner peripheral portion or surface, 14, of like low pitch which fits the cone, 13. The rib, 12, is not as high as the clearance space, 11, and the cone, 14, is wider than the cone, 13, and this construction provides the necessary easing clearance between the two cones, which I find necessary to the easy mounting and demounting of the rim. Alongside of the cone, 14, and of less diameter, is the circumferential stop-rib, 15. This rib is integral with the body of the rim, 6, and its inner circumference is enough larger than the circumference of the opposed portion, 16, of the fixed rim to permit the rib to button over the fixed rim. To facilitate that action the portion, 16, of the fixed rim, 5, is preferably beveled or curved toward the outer edge, 17, of the fixed rim. For sake of symmetry, and saving in cost, the inner part, 18, of the fixed rim is similarly beveled.

Obviously, when the rim is buttoned upon the wheel in the manner depicted in Fig. 2, the cone of the wheel, 13, receives the cone, 14, of the rim. In this manner I provide the rim with a circumferential support upon and contact with the wheel. Furthermore, the support thus provided is disposed in the middle or neutral plane of both wheel and rim and thereby the rim is sustained in ideally balanced condition as concerns the forces to which the rim, tire and wheel are subjected in service. I call special attention to the fact that though the cone, 13, is of appreciable width, as necessitated by the nature of the metal used, and which cannot be relied upon to maintain actual single-line or knife-edge contact, the engagement, nevertheless, properly may be described as a single-line conical contact between the wheel and the rim.

The engagement of the described cones would be quite sufficient under normal circumstances to prevent the driving of the rim off the wheel in the direction of the body of the vehicle, that is, toward the inner side of the wheel. But I use the circumferential stop rib, 15, to insure the rim against such dislodgment and more particularly for the purpose of correctly alining the engaged cones and thereby effectively centering the rim on the wheel, and also insuring the perpendicularity of the rim on the wheel.

After positioning the rim on the wheel, as described, I secure the clutch, i. e., the engaging cones, by means of a plurality of clutch or stop lugs, 19, held in place by the nuts, 20, on the threaded bolts, 21. The bolts are ribbed to hold them against turning in the wooden felly. The heads, 22, of the bolts engage the inner edge of the fixed rim, 5, and hold it against the thrust of the stop lugs, 19. The stop lug is of peculiar and novel form. I prefer that it shall be stamped from sheet metal. It is a substantially right-angled device, of great strength, and comprises integral parts as follows, to-wit:—the tongue, or stop-portion proper, 23; the body portion, 24;—the vertical or radially outstanding ribs, 25;—the inner bearing end, 26;—and the outwardly embossed center portion, 27. The combined curved and right angled form thus given the device insures great strength with a minimum amount of metal. The tongue, 23, is thinner than the clearance space, 11, and its end, 23', bears against the outer side of the rim rib, 15. The end, 26, presents a broad, flat surface, 26', which bears on the wooden felly, and may be used without the ordinary metal face plate or washer on the latter. The nut, 20, which I prefer to use is provided with a thin stem or neck, 28. This passes loosely through the hole, 29, in the stop lug and its end, 30, is spun or burred to loosely lock the nut in the stop lug, 19, as best shown in Fig. 5. Obviously, the nut and the right angle stop lug may be removed from the bolt together, and likewise replaced thereon. There may be three or more of these stop lugs, 19, according to the service to which the wheel is to be subjected. In ordinary practice I prefer to make use of six thereof, as depicted in Fig. 1.

The setting home of these stop lugs serves to fasten the clutch cones together and when so secured the friction of the parts is usually sufficient to prevent the circumferential turning or creeping of the rim on the wheel. However, as hereinafter explained, I prefer to always interpose an additional driver or driving connection between the rim and wheel. The driving or connecting stud is preferably fixed on the demountable rim and engages a hole or notch in the fixed rim; or, if desired, the connection may be provided through an engagement with one of the stop lugs.

The fixed and demountable rims are manufactured by rolling and welding methods which do not yield absolutely uniform results. In other words, it will be difficult to produce the parts commercially in lots and make every fixed rim and every demountable rim to button on readily and yet interfit with the degree of accuracy necessary to the simultaneous complete engagement of both the conical and side surfaces of the ribs, 12 and 15. In the case of non-transplit rims, I am forced to content myself with an approximation of exactness, which in most cases causes the cones, 13 and 14, to engage fully before the stop rib, 15, makes full circumferential contact with the rib, 12. Under that condition the perpendicularity of the rim is not bound to result from the buttoning together of the rims. But by transplitting the rim and providing lost motion, to the extent of a small fraction of an inch, between the rim-ends I am able to attain an ideal interfitting condition without difficulty.

Referring now to Figs. 10, 11, and 12, it will be noted that the valve stem, 8, passes through a valve stem hole, 31, in the demountable rim, 6. I split the rim preferably closely adjacent the valve stem hole, so that the valve stem spreader may cover the portion of the split which would otherwise be exposed within the tire. The split is represented by the line, 32, in Fig. 12, and obviously when the rim is transversely split, as there depicted, the rim ends, 6ª and 6ᵇ, will take the form of that split or cut. The split or cut illustrated is included in and claimed in my companion application, Serial No. 88,668, filed April 3, 1916, and is of a preferred kind, to cause the rim ends to be self-alining and self-holding under the pressure of an inflated tire positioned on the rim. I preferably place one of the stop lugs, 19, adjacent to the split portion of the rim so that the stop portion, 23, may straddle the split therein, i. e., engage the rib, 15, on both sides of the split. Before splitting the rim I apply to the inner periphery thereof a short section or bar of metal, as by riveting or welding the same. Thus in the region of the valve stem the section of the rim takes on the appearance shown in Fig. 3. Whatever the manner of applying or forming this dotted strip or portion, 33, it may be regarded as an integral part of the rim, 6, and for sake of clearness I have shown it as though it were integral. Thus, when the rim is transversely cut or split, it is provided with two inward driving, spacing and interlocking projections or studs, 34, 35. The ends, of the projection shown, abut at the split when the rim ends are closed together, after the manner described and claimed in Patent Number 1,095,771, granted May 5th, 1914. To accommodate these projections I cut or shear away the rib, 12, making the notch therein slightly longer than the combined length of the studs or drivers, 34 and 35. In ordinary practice it is sufficient if the lost motion, indicated at 37 in Fig. 12, is approximately one-sixteenth of an inch. The shearing of the rib, 12, provides ends or abutments, 38 and 39, thereon wherewith the ends of the parts 34 and 35 may respectively engage, as shown in Figs. 10 and 11. Such engagement is sufficient to form an adequate driving connection between the rim and wheel and is also sufficient to prevent the circumferential expansion of the rim beyond the degree which is necessary to allow the rib, 15, to circumferentially contact the outer side of the coned stop rib, 12, on the wheel. It will now be clear that while the rim ends are in the condition shown in Fig. 12 at the time that the rim and inflated tire are placed on the wheel, the cones may nevertheless be partly (almost fully) engaged in that position. When the buttoning on of the rim has proceeded to that extent, the setting home of the stop lugs, 19, forces the clutch parts from the condition represented in Fig. 4 to the completely engaged condition represented in Figs. 3, 5, 11 and 12; such complete engagement being permitted by the illustrated circumferential expansion or distension of the demountable rim on the wheel and within the carried tire.

Fig. 6 of the drawings illustrates an inverted relation of the conical and stop ribs on the fixed and demountable rims. The cone, 40, is formed directly on the periphery of the fixed rim; likewise the stop-rib, 41; while the interfitting cone, 42, belonging to the demountable rim, is formed on a circumferential rib, 43, which is integral with the demountable rim 6ª. I prefer that, as before, the single-line conical bearing shall be located in or at the neutral plane of the demountable rim.

With a view to showing that the mounting of the rim exactly in the neutral plane thereof is not in all cases essential to the embodiment of my invention, I have shown two modifications thereof, in which the bearing is arranged between the neutral plane and the outer side of the wheel. Thus in Fig. 4 the bearing rib and cone, 44, are positioned at the outer side of the neutral plane. One reason for so positioning it is to place the stop rib, 45, of the wider demountable rim 6ᵇ within reach of stop-lugs, 19, of the same dimensions as those which I employ for rims of the width shown in Figs. 3 and 5. In some cases I prefer the structure shown in Fig. 7, placing the coned rib, 46, close to the outer edge of the wheel and providing the demountable rim 6ᶜ with a corresponding stop-rib, 47, in position to be engaged by a number of relatively flat stop-lugs, 48.

The extreme simplicity and low cost of the described construction will be apparent to all who are skilled in the art; and generally it will be apparent that by means of the described structure, I attain all the primary objects, and fulfil all of the requirements, set forth in the opening paragraphs of this specification.

While I have illustrated and described my invention in accordance with the patent statutes, I desire it to be understood that the details of construction may be materially varied, and that many changes, modifications, and substitutions may be made in the structure herein illustrated, without departing from the spirit and scope of my invention as set forth in the appended claims.

Having thus described my invention, I claim as new and desire to secure by Letters Patent:—

1. The improvement herein described, comprising in combination, a motor vehicle wheel and a complementary tire-carrying demountable rim of greater width than the wheel periphery, a clutch connection therebetween and composed of still narrower complementary circumferential cones and stop ribs, and coacting adjustable stop lugs.

2. The improvement herein described, comprising, in combination, a motor vehicle wheel and a complementary tire carrying demountable rim, a clutch connection therebetween and composed of narrow complementary circumferential cones and stop ribs, and coacting adjustable stop lugs.

3. The improvement herein described, comprising, in combination a motor vehicle wheel and a complementary tire carrying demountable rim of greater width than the wheel periphery, a clutch connection therebetween composed of still narrower complementary circumferential cones and stop ribs positioned substantially at the neutral plane of the rim and wheel and coacting adjustable stop lugs.

4. The improvement herein described, comprising, in combination a motor vehicle wheel and a complementary tire carrying demountable rim of greater width than the wheel periphery, a driver and clutch connection both therebetween, said connection being composed of narrow complementary circumferential cones and stop ribs integral with respective rim and wheel parts and coacting stop lugs adjustably positioned on the outer side of the wheel.

5. The improvement herein described, comprising, in combination a motor vehicle wheel and a complementary tire-carrying transplit demountable rim, a clutch connection therebetween and composed of narrow circumferential complementary supporting cones and axial stop ribs, driving studs on the rim and in the described lost-motion engagement with the wheel, and coacting stop lugs on the wheel and bearing on the complementary rib on said rim.

6. The improvement herein described, comprising, in combination a motor vehicle wheel and a complementary tire carrying demountable rim of greater width than the wheel periphery, a clutch connection composed of narrow complementary circumferential cones and stop ribs between the wheel periphery and rim and between the edges of the wheel periphery, and coacting stop lugs adjustable on the wheel and having parts extending between the wheel and rim and into engagement with the rib on said rim.

7. The combination of a wheel having an outstanding rib on its periphery, the same being narrower than said periphery and presenting a backwardly and outwardly inclined clutch surface, a tire carrying flanged demountable rim having a like narrow complementary inclined clutch surface on its inner periphery and also provided with a stop rib for side engagement with said rib on the wheel, and coacting adjustable stop means on the wheel and pressing on the stop rib of the rim.

8. The improvement herein described comprising a demountable rim having on its inner periphery a single narrow conical clutch surface and circumferential stop means extending inwardly beyond the same at the outer side thereof.

9. The improvement herein described, comprising a demountable rim having on its inner periphery a single narrow conical clutch surface substantially at the neutral plane of the rim and circumferential stop means extending inwardly beyond the same at the outer side thereof.

10. The improvement herein described, comprising a demountable rim having on its inner periphery a single narrow circumferential conical clutch surface and a single narrow circumferential stop rib bordering the outer and circumferentially smaller end of the cone formed by said surface.

11. The improvement herein described, comprising a demountable rim having on its inner periphery a single narrow circumferential conical clutch surface at the neutral plane of the rim and a single narrow circumferential stop rib bordering the outer and circumferentially smaller end of the cone formed by said surface.

12. The improvement herein described, comprising a demountable integrally flanged transplit rim having driving projections upon its rim ends and provided with a narrow supporting contact cone and a narrow circumferential rib bordering the same and both on the inner periphery of the rim.

13. The improvement herein described, comprising a demountable integrally flanged transplit rim having driving projections upon the rim ends and provided with a narrow supporting contact cone and a narrow circumferential rib bordering the same, both being on the inner periphery of the rim and substantially at the neutral plane of the same.

In testimony whereof I have hereunto set my hand this 5th day of April, 1916.

ERLE KING BAKER.